US012795282B2

(12) United States Patent
Lin

(10) Patent No.: US 12,795,282 B2
(45) Date of Patent: Nov. 10, 2026

(54) CHARGING CASE FOR WIRELESS EARPHONE, CHARGING CASE, AND WIRELESS CHARGING SYSTEM

(71) Applicant: GUANGDONG OPPO MOBILE TELECOMMUNICATIONS CORP., LTD., Dongguan (CN)

(72) Inventor: Jincun Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 881 days.

(21) Appl. No.: 18/300,197

(22) Filed: Apr. 13, 2023

(65) Prior Publication Data

US 2023/0254625 A1 Aug. 10, 2023

Related U.S. Application Data

(63) Continuation of application No. PCT/CN2021/119972, filed on Sep. 23, 2021.

(30) Foreign Application Priority Data

Oct. 16, 2020 (CN) .......................... 202011111260.8
Oct. 16, 2020 (CN) .......................... 202022317528.5

(51) Int. Cl.
*H04R 1/1025* (2026.01)
*H02J 7/70* (2026.01)
(Continued)

(52) U.S. Cl.
CPC ............ *H04R 1/1025* (2013.01); *H02J 7/731* (2026.01); *H02J 7/975* (2026.01); *H02J 50/10* (2016.02); *H02J 50/80* (2016.02); *H04R 2460/17* (2013.01)

(58) Field of Classification Search
CPC ........ H04R 1/1025; H02J 7/731; H02J 7/975; H02J 50/10; H02J 50/80
(Continued)

(56) References Cited

U.S. PATENT DOCUMENTS 8,111,041 B2 * 2/2012 Onishi .................... H02J 7/485 320/108
8,381,990 B2 * 2/2013 Shibamoto ............... H01Q 7/00 235/492
(Continued)

FOREIGN PATENT DOCUMENTS

CN 103269092 8/2013
CN 104052166 9/2014
(Continued)

OTHER PUBLICATIONS

CNIPA, First Office Action for CN Application No. 202011111260.8, Aug. 14, 2024.
(Continued)

*Primary Examiner* — John T Trischler
(74) *Attorney, Agent, or Firm* — Hodgson Russ LLP

(57) ABSTRACT

The charging case for the wireless earphone includes a coil, a metal portion, and a control module. The coil is configured for wireless communication between the charging case for the wireless earphone and a charging base, and configured to receive electrical energy from the charging base through electromagnetic induction. The metal portion is spaced apart from the coil. The control module is electrically connected with the coil. The control module is configured to control, according to a temperature of the metal portion, to establish or disconnect the wireless communication via the coil between the charging case for the wireless earphone and the charging base.

18 Claims, 6 Drawing Sheets

(51) Int. Cl.

| | |
|---|---|
| ***H02J 7/90*** | (2026.01) |
| ***H02J 50/10*** | (2016.01) |
| ***H02J 50/80*** | (2016.01) |

(58) Field of Classification Search
USPC ........................................... 320/108; 307/104
See application file for complete search history.

(56) References Cited

U.S. PATENT DOCUMENTS

| | | | | |
|---|---|---|---|---|
| 8,519,667 | B2 * | 8/2013 | Tsai | H02J 7/975 320/108 |
| 9,080,988 | B2 * | 7/2015 | Okada | B60L 53/124 |
| 9,343,921 | B2 * | 5/2016 | Tanabe | H02J 50/80 |
| 9,356,461 | B2 * | 5/2016 | Howard | H02J 50/10 |
| 9,379,570 | B2 * | 6/2016 | Tanabe | H02J 7/61 |
| 9,393,420 | B2 * | 7/2016 | Almendinger | A61N 1/36142 |
| 9,467,002 | B2 * | 10/2016 | Martin | H02J 7/485 |
| 9,525,209 | B2 * | 12/2016 | Tanabe | H01Q 7/00 |
| 9,623,758 | B2 * | 4/2017 | Yuasa | B60L 53/126 |
| 9,667,084 | B2 * | 5/2017 | Pigott | H04B 5/79 |
| 9,769,558 | B2 * | 9/2017 | Chandramohan | A45C 11/00 |
| 9,912,166 | B2 * | 3/2018 | Baarman | H02J 50/12 |
| 9,961,431 | B2 * | 5/2018 | McPeak | A45C 11/00 |
| 9,961,433 | B2 * | 5/2018 | Chawan | A45C 11/00 |
| 9,961,446 | B2 * | 5/2018 | Li | G01L 9/008 |
| 9,967,644 | B2 * | 5/2018 | Chawan | A45C 11/00 |
| 9,967,648 | B2 * | 5/2018 | Panecki | A45C 11/00 |
| 9,967,649 | B2 * | 5/2018 | Chandramohan | A45C 11/00 |
| 9,967,650 | B2 * | 5/2018 | Chawan | A45C 11/00 |
| 9,973,840 | B2 * | 5/2018 | Wagman | A45C 11/00 |
| 9,973,845 | B2 * | 5/2018 | Chawan | A45C 11/00 |
| 10,003,880 | B2 * | 6/2018 | Wagman | A45C 11/00 |
| 10,003,881 | B2 * | 6/2018 | Cousins | A45C 11/00 |
| 10,009,678 | B2 * | 6/2018 | Panecki | A45C 11/00 |
| 10,097,025 | B2 * | 10/2018 | Yajima | F28D 20/028 |
| 10,097,913 | B2 * | 10/2018 | Zörkendörfer | A45C 11/00 |
| 10,182,282 | B2 * | 1/2019 | McPeak | A45C 11/00 |
| 10,212,506 | B2 * | 2/2019 | Panecki | A45C 11/00 |
| 10,218,223 | B2 * | 2/2019 | Hatanaka | H02J 7/70 |
| 10,225,637 | B2 * | 3/2019 | Panecki | A45C 11/00 |
| 10,263,452 | B2 * | 4/2019 | Oh | H02J 50/12 |
| 10,320,230 | B2 * | 6/2019 | Golko | H01F 27/025 |
| 10,397,682 | B2 * | 8/2019 | Chawan | A45C 11/00 |
| 10,397,683 | B2 * | 8/2019 | LeBlanc | A45C 11/00 |
| 10,447,059 | B2 * | 10/2019 | Yajima | F28D 20/028 |
| 10,477,296 | B2 * | 11/2019 | Kim | H04R 1/1025 |
| 10,498,179 | B2 * | 12/2019 | Shichino | H02J 50/80 |
| 10,505,396 | B2 * | 12/2019 | Iwasaki | H02J 50/80 |
| 10,530,188 | B2 * | 1/2020 | Baarman | H02J 50/12 |
| 10,659,859 | B2 * | 5/2020 | Solum | H04R 25/55 |
| 10,681,446 | B2 * | 6/2020 | Chawan | A45C 11/00 |
| 10,728,642 | B2 * | 7/2020 | Solum | H04R 25/55 |
| 10,734,829 | B2 * | 8/2020 | Yajima | F28D 20/028 |
| 10,866,290 | B2 * | 12/2020 | Ding | G06F 1/1677 |
| 10,880,630 | B2 * | 12/2020 | Chawan | A45C 11/00 |
| 10,904,652 | B2 * | 1/2021 | Chawan | A45C 11/00 |
| 10,910,886 | B2 * | 2/2021 | Huang | H02J 50/80 |
| 10,938,253 | B2 * | 3/2021 | Sun | H02J 50/80 |
| 10,965,144 | B2 * | 3/2021 | Oh | H02J 50/12 |
| 11,019,417 | B2 * | 5/2021 | Solum | H04R 25/55 |
| 11,026,010 | B2 * | 6/2021 | Chawan | A45C 11/00 |
| 11,026,011 | B2 * | 6/2021 | Chawan | A45C 11/00 |
| 11,039,238 | B2 * | 6/2021 | Schrems | H04R 1/1025 |
| 11,056,920 | B2 * | 7/2021 | Hatanaka | H02J 7/70 |
| 11,133,696 | B2 * | 9/2021 | Mehta | H02J 50/10 |
| 11,172,101 | B1 * | 11/2021 | Boozer | H04N 23/57 |
| 11,309,746 | B2 * | 4/2022 | Nakano | H02J 50/12 |
| 11,392,346 | B2 * | 7/2022 | Lee | G06F 1/325 |
| 11,425,520 | B2 * | 8/2022 | Yan | H04R 1/1041 |
| 11,503,397 | B2 * | 11/2022 | Ding | H02J 7/685 |
| 11,509,169 | B2 * | 11/2022 | Stingu | H02J 50/12 |
| 11,523,206 | B2 * | 12/2022 | Lehnert | H04R 1/1025 |
| 11,532,950 | B2 * | 12/2022 | Shirsat | H02J 50/12 |
| 11,594,916 | B2 * | 2/2023 | Oh | H02J 50/12 |
| 11,604,233 | B2 * | 3/2023 | Ding | H02J 50/10 |
| 11,632,621 | B2 * | 4/2023 | Gong | H04R 1/1041 381/105 |
| 11,664,686 | B2 * | 5/2023 | Sun | H02J 50/80 307/31 |
| 11,690,428 | B2 * | 7/2023 | Chawan | A45C 11/00 381/380 |
| 11,729,540 | B2 * | 8/2023 | Olson | G06F 3/016 381/384 |
| 11,756,719 | B2 * | 9/2023 | Mehta | H01F 27/28 320/108 |
| 11,843,254 | B2 * | 12/2023 | Philp | H02J 50/005 |
| 11,910,147 | B2 * | 2/2024 | Lehnert | H04R 1/1025 |
| 11,944,172 | B2 * | 4/2024 | Chawan | A45C 11/00 |
| 11,974,088 | B2 * | 4/2024 | Olson | H04R 25/603 |
| 12,047,720 | B2 * | 7/2024 | Choi | H04R 1/02 |
| 12,191,689 | B2 * | 1/2025 | Hatanaka | H02J 7/70 |
| 12,388,181 | B2 * | 8/2025 | Wu | H01Q 5/378 |
| 12,425,758 | B2 * | 9/2025 | Lehnert | H04R 1/1025 |
| 12,474,744 | B2 * | 11/2025 | Ding | G06F 1/1677 |
| 12,526,568 | B2 * | 1/2026 | Higgins | H04R 1/1041 |
| 12,542,991 | B2 * | 2/2026 | Hollabaugh | H04B 5/79 |
| 12,556,013 | B2 * | 2/2026 | Ryan | G01V 3/04 |
| 2008/0197802 | A1 * | 8/2008 | Onishi | H02J 7/485 320/108 |
| 2008/0237358 | A1 * | 10/2008 | Shibamoto | H01Q 7/00 235/492 |
| 2009/0021219 | A1 * | 1/2009 | Yoda | H02J 7/47 307/104 |
| 2010/0013321 | A1 * | 1/2010 | Onishi | G08C 17/04 307/104 |
| 2011/0169446 | A1 * | 7/2011 | Kondo | H01M 10/4257 320/108 |
| 2011/0210620 | A1 * | 9/2011 | Shinoda | H02J 50/10 307/104 |
| 2012/0038317 | A1 * | 2/2012 | Miyamoto | H02J 50/12 320/108 |
| 2012/0049791 | A1 * | 3/2012 | Tanabe | H01Q 7/00 320/108 |
| 2012/0146577 | A1 * | 6/2012 | Tanabe | H02J 50/80 320/108 |
| 2012/0205988 | A1 * | 8/2012 | Tanabe | H02J 7/61 307/104 |
| 2012/0235636 | A1 * | 9/2012 | Partovi | H01F 38/14 320/108 |
| 2012/0286724 | A1 * | 11/2012 | Tsai | H02J 7/975 320/108 |
| 2013/0238048 | A1 * | 9/2013 | Almendinger | A61N 1/36142 607/40 |
| 2013/0241476 | A1 * | 9/2013 | Okada | B60L 53/124 320/108 |
| 2014/0021914 | A1 * | 1/2014 | Martin | H02J 7/485 320/109 |
| 2014/0084856 | A1 * | 3/2014 | Howard | H02J 50/10 320/152 |
| 2014/0241557 | A1 * | 8/2014 | Martius | H01Q 21/24 381/323 |
| 2014/0266019 | A1 * | 9/2014 | Pigott | H04B 5/79 320/108 |
| 2015/0091514 | A1 * | 4/2015 | Yuasa | B60L 53/126 320/108 |
| 2015/0171633 | A1 * | 6/2015 | Nakano | H04B 5/26 307/104 |
| 2015/0207333 | A1 * | 7/2015 | Baarman | H02J 50/12 307/104 |
| 2015/0280483 | A1 * | 10/2015 | Golko | H01F 27/025 320/108 |
| 2016/0006292 | A1 * | 1/2016 | Hatanaka | H02J 7/70 320/108 |
| 2016/0156213 | A1 * | 6/2016 | Yajima | F28D 20/028 320/152 |
| 2016/0204642 | A1 * | 7/2016 | Oh | H02J 50/12 320/108 |
| 2016/0303378 | A1 * | 10/2016 | Almendinger | A61N 1/36142 |
| 2017/0093079 | A1 * | 3/2017 | Wagman | A45C 11/00 |
| 2017/0093453 | A1 * | 3/2017 | Panecki | A45C 11/00 |
| 2017/0093454 | A1 * | 3/2017 | Chawan | A45C 11/00 |

(56) References Cited

U.S. PATENT DOCUMENTS

| | | | | |
|---|---|---|---|---|
| 2017/0094381 | A1* | 3/2017 | LeBlanc | A45C 11/00 |
| 2017/0094390 | A1* | 3/2017 | Chawan | A45C 11/00 |
| 2017/0094391 | A1* | 3/2017 | Panecki | A45C 11/00 |
| 2017/0094392 | A1* | 3/2017 | Zörkendörfer | A45C 11/00 |
| 2017/0094393 | A1* | 3/2017 | Panecki | A45C 11/00 |
| 2017/0094394 | A1* | 3/2017 | McPeak | A45C 11/00 |
| 2017/0094395 | A1* | 3/2017 | McPeak | A45C 11/00 |
| 2017/0094396 | A1 | 3/2017 | Chandramohan et al. | |
| 2017/0094397 | A1* | 3/2017 | Wagman | A45C 11/00 |
| 2017/0094398 | A1* | 3/2017 | Cousins | A45C 11/00 |
| 2017/0094399 | A1* | 3/2017 | Chandramohan | A45C 11/00 |
| 2017/0149291 | A1 | 5/2017 | Iwasaki et al. | |
| 2017/0150269 | A1* | 5/2017 | Li | G01L 9/008 |
| 2017/0164089 | A1* | 6/2017 | Lee | H04R 1/1025 |
| 2017/0238087 | A1* | 8/2017 | Chawan | A45C 11/00<br>381/380 |
| 2017/0245038 | A1* | 8/2017 | Chawan | A45C 11/00 |
| 2017/0347182 | A1* | 11/2017 | Chawan | A45C 11/00 |
| 2018/0076672 | A1* | 3/2018 | Shichino | H02J 50/80 |
| 2018/0115816 | A1* | 4/2018 | Panecki | A45C 11/00 |
| 2018/0226835 | A1* | 8/2018 | Baarman | H02J 50/12 |
| 2018/0241223 | A1* | 8/2018 | Bae | H02J 7/933 |
| 2018/0248414 | A1* | 8/2018 | Liu | H02J 50/00 |
| 2019/0058359 | A1* | 2/2019 | Hatanaka | H02J 7/70 |
| 2019/0067972 | A1* | 2/2019 | Yajima | F28D 20/028 |
| 2019/0081499 | A1* | 3/2019 | Sun | H02J 50/80 |
| 2019/0200113 | A1* | 6/2019 | Kim | H04R 1/1025 |
| 2019/0245373 | A1* | 8/2019 | Oh | H02J 50/12 |
| 2019/0268706 | A1* | 8/2019 | Solum | H04R 25/55 |
| 2019/0289381 | A1* | 9/2019 | Chawan | A45C 11/00 |
| 2019/0289382 | A1* | 9/2019 | Chawan | A45C 11/00 |
| 2019/0289383 | A1* | 9/2019 | Chawan | A45C 11/00 |
| 2019/0312459 | A1* | 10/2019 | Garbus | H02J 50/12 |
| 2020/0044472 | A1* | 2/2020 | Yajima | F28D 20/028 |
| 2020/0068286 | A1* | 2/2020 | Schrems | H04R 1/1025 |
| 2020/0076247 | A1* | 3/2020 | Huang | H05B 1/0269 |
| 2020/0119595 | A1* | 4/2020 | Nakano | H02J 50/12 |
| 2020/0213705 | A1* | 7/2020 | Ding | H02J 7/685 |
| 2020/0227935 | A1* | 7/2020 | Mehta | H02J 50/10 |
| 2020/0233046 | A1* | 7/2020 | Ding | H02J 50/10 |
| 2020/0257496 | A1* | 8/2020 | Lee | G10L 15/30 |
| 2020/0259369 | A1* | 8/2020 | Stingu | H02J 50/12 |
| 2020/0275184 | A1* | 8/2020 | Chawan | A45C 11/00 |
| 2020/0288229 | A1* | 9/2020 | Chawan | A45C 11/00 |
| 2020/0336817 | A1* | 10/2020 | Lee | H04R 1/1025 |
| 2020/0358316 | A1* | 11/2020 | Shirsat | H02J 50/12 |
| 2021/0037306 | A1* | 2/2021 | Lehnert | H04R 1/1025 |
| 2021/0063499 | A1* | 3/2021 | Ding | G06F 1/1677 |
| 2021/0144463 | A1* | 5/2021 | Gong | H04R 1/1091 |
| 2021/0144500 | A1* | 5/2021 | Yan | H04R 29/005 |
| 2021/0152036 | A1* | 5/2021 | Sun | H02J 50/80 |
| 2021/0152912 | A1* | 5/2021 | Chawan | A45C 11/00 |
| 2021/0218284 | A1* | 7/2021 | Oh | H02J 50/12 |
| 2021/0274273 | A1* | 9/2021 | Chawan | A45C 11/00 |
| 2021/0313820 | A1* | 10/2021 | Yang | H02J 7/65 |
| 2021/0313837 | A1* | 10/2021 | Hatanaka | H02J 7/70 |
| 2022/0014046 | A1* | 1/2022 | Mehta | H01F 27/28 |
| 2022/0086554 | A1* | 3/2022 | Lee | H04R 1/1025 |
| 2022/0109926 | A1* | 4/2022 | Olson | H04R 25/603 |
| 2022/0376549 | A1* | 11/2022 | Philp | H02J 50/005 |
| 2023/0021065 | A1* | 1/2023 | Sun | H02J 50/80 |
| 2023/0067147 | A1* | 3/2023 | Choi | H04R 1/02 |
| 2023/0199365 | A1* | 6/2023 | Olson | H04R 1/1041<br>381/384 |
| 2023/0224622 | A1* | 7/2023 | Lehnert | H04R 1/1025<br>381/74 |
| 2023/0280797 | A1* | 9/2023 | Ding | G06F 1/1677<br>307/104 |
| 2023/0301408 | A1* | 9/2023 | Chawan | A45C 11/00 |
| 2023/0361470 | A1* | 11/2023 | Wu | H01Q 1/521 |
| 2024/0106250 | A1* | 3/2024 | Ryan | G01V 3/04 |
| 2024/0107217 | A1* | 3/2024 | Hollabaugh | H04B 5/79 |
| 2024/0114282 | A1* | 4/2024 | Higgins | H04R 1/1041 |
| 2024/0162748 | A1* | 5/2024 | Ha | H02J 50/005 |
| 2024/0348962 | A1* | 10/2024 | Lehnert | H04R 1/1025 |
| 2026/0082145 | A1* | 3/2026 | Lehnert | H04R 1/1025 |

FOREIGN PATENT DOCUMENTS

| | | | |
|---|---|---|---|
| CN | 209913517 | 1/2020 | |
| CN | 110768332 | 2/2020 | |
| CN | 111050242 | 4/2020 | |
| CN | 111447521 | 7/2020 | |
| CN | 111641272 | 9/2020 | |
| CN | 214045069 | 8/2021 | |
| WO | 2018081997 | 5/2018 | |
| WO | WO-2018081997 A1 * | 5/2018 | H02J 50/12 |

OTHER PUBLICATIONS

WIPO, International Search Report and Written Opinion for International Application No. PCT/CN2021/119972, Dec. 7, 2021.

* cited by examiner

CHARGING CASE FOR WIRELESS EARPHONE, CHARGING CASE, AND WIRELESS CHARGING SYSTEM

CROSS-REFERENCE TO RELATED APPLICATION(S)

This application is a continuation of International Application No. PCT/CN2021/119972, filed Sep. 23, 2021, which claims priority to Chinese Patent Application No. 202011111260.8, filed Oct. 16, 2020, and Chinese Patent Application No. 202022317528.5, filed Oct. 16, 2020, the entire disclosures of which are hereby incorporated by reference.

TECHNICAL FIELD

This disclosure relates to the field of wireless charging technology, and in particular to a charging case for a wireless earphone, a charging case, and a wireless charging system.

BACKGROUND

With developments of electronic technologies, wireless charging technologies become more and more mature, such that more and more devices support wireless charging currently.

SUMMARY

In a first aspect, a charging case for a wireless earphone is provided in implementations of the present disclosure. The charging case for the wireless earphone includes a coil, a metal portion, and a control module. The coil is configured for wireless communication between the charging case for the wireless earphone and a charging base, and configured to receive electrical energy from the charging base through electromagnetic induction during the wireless communication between the charging case for the wireless earphone and the charging base. The metal portion is spaced apart from the coil. The control module is electrically connected with the coil. The control module is configured to control, according to a temperature of the metal portion, to establish or disconnect the wireless communication via the coil between the charging case for the wireless earphone and the charging base.

In a second aspect, a charging case is further provided in implementations of the present disclosure. The charging case includes a coil, a metal portion, and a control module. The coil is configured for wireless communication between the charging case and a charging base, and configured to receive electrical energy from the charging base through electromagnetic induction during the wireless communication between the charging case and the charging base. The metal portion is spaced apart from the coil. A temperature of the metal portion changes, when the coil receives the electrical energy from the charging base through the electromagnetic induction. The control module is electrically connected with the coil. The control module is configured to control, according to the temperature of the metal portion, to establish or disconnect the wireless communication via the coil between the charging case and the charging base.

In a third aspect, a wireless charging system is further provided in implementations of the present disclosure. The wireless charging system includes a charging base and a charging case for a wireless earphone. The charging base is configured to radiate electrical energy wirelessly. The charging case for the wireless earphone includes a coil, a metal portion, and a control module. The coil is configured for wireless communication between the charging case for the wireless earphone and the charging base, and configured to receive electrical energy from the charging base through electromagnetic induction during the wireless communication between the charging case for the wireless earphone and the charging base. The metal portion is spaced apart from the coil. The control module is electrically connected with the coil. The control module is configured to control, according to a temperature of the metal portion, to establish or disconnect the wireless communication via the coil between the charging case for the wireless earphone and the charging base.

BRIEF DESCRIPTION OF THE DRAWINGS

In order to explain technical solutions in implementations of the present disclosure more clearly, the following will give a brief introduction to accompanying drawings which are needed to be used in description of the implementations. Apparently, the accompanying drawings in the following description are merely some implementations of the present disclosure. For those skilled in the art, other accompanying drawings can be obtained according to these accompanying drawings without creative efforts.

DETAILED DESCRIPTION

The following will describe technical solutions in implementations of the present disclosure clearly and completely with reference to the accompanying drawings in implementations of the present disclosure. Apparently, implementations described herein are merely some implementations, rather than all implementations, of the present disclosure. Based on implementations described herein, all other implementations obtained by those of ordinary skill in the art without creative effort shall fall within the protection scope of the present disclosure.

A wireless charging system is provided in implementations of the present disclosure. The wireless charging system can be configured to charge an electronic device wirelessly, such as charging a charging case. The charging case can be configured to charge other electronic devices. For example, the charging case may be a charging case for a wireless earphone. The charging case for the wireless earphone can be configured to charge the wireless earphone.

Figure 1:
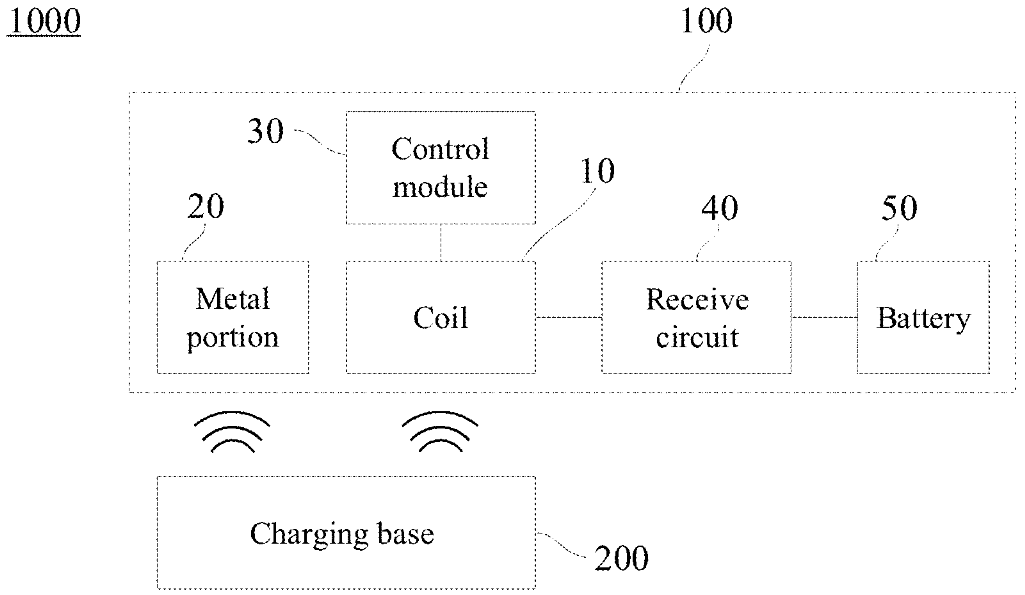
FIG. 1 is a schematic structural view of a wireless charging system provided in implementations of the present disclosure.

Reference can be made to FIG. 1, which is a schematic structural view of a wireless charging system 1000 provided in implementations of the present disclosure. The wireless charging system 1000 includes a charging case 100 and a charging base 200. The charging case 100 can be configured to charge other electronic devices. The charging base 200 is coupled with an external power source, such as a power outlet. For illustrative purpose, the charging case 100 is, merely for example, a charging case for a wireless earphone hereinafter.

A charging case 100 for a wireless earphone includes a coil 10, a metal portion 20, a control module 30, a receive circuit 40, and a battery 50.

The coil 10 may be a wound coil, such as a coil formed by winding a copper wire. On one hand, the coil 10 is configured to receive and transmit a wireless signal, such that the charging case 100 for the wireless earphone can communicate with a charging base 200 wirelessly; on the other hand, the coil 10 is electrically connected with the charging base 200 through electromagnetic coupling, such that the charging case 100 for the wireless earphone can receive electrical energy from the charging base 200 through electromagnetic induction.

It can be understood that the charging base 200 may also include a coil. The coil in the charging base 200 can be configured to radiate electrical energy and configured for wireless communication with the charging case 100 for the wireless earphone.

During operation of the wireless charging system 1000, a handshake signal can be broadcast outward by the charging base 200 first, for example, the handshake signal can be broadcast every 1 second. The handshake signal can be broadcast outward without a specific receive end, and the handshake signal is used to establish wireless communication between the charging base 200 and an electronic device to-be-charged. When the charging base 200 transmits the handshake signal outward, the wireless communication between the charging case 100 for the wireless earphone and charging base 200 has been not established, and the charging base 200 radiates no electrical energy.

When the charging case 100 for the wireless earphone is in a communication range of the charging base 200, for example, when a user places the charging case 100 for the wireless earphone on the charging base 200, the charging case 100 for the wireless earphone receives the handshake signal transmitted by the charging base 200 and feedbacks a response signal to the charging base 200. Subsequently, the charging base 200 establishes the wireless communication with the charging case 100 for the wireless earphone according to the response signal. It can be understood that the wireless communication can be kept after the wireless communication between the charging case 100 for the wireless earphone and the charging base 200 is established. For example, the charging case 100 for the wireless earphone can be configured to transmit an energy signal to the charging base 200 via the coil 10 periodically, such that the charging base 200 can control radiation of the electrical energy according to the energy signal after receiving the energy signal. When not receiving the energy signal, the charging base 200 stops the radiation of the electrical energy, and when the energy signal received does not meet a preset condition, the charging base 200 adjusts the radiation of the electrical energy.

Once the wireless communication between the charging case 100 for the wireless earphone and the charging base 200 is established, the charging base 200 starts to radiate the electrical energy. When the wireless communication between the charging case 100 for the wireless earphone and the charging base 200 is established and kept, the charging case 100 for the wireless earphone can receive electrical energy from the charging base 200 through electromagnetic induction, such that the charging base 200 charges the charging case 100 for the wireless earphone.

It should be noted that only when the wireless communication between the charging case 100 for the wireless earphone and the charging base 200 is established and kept, the charging base 200 defaults that the charging case 100 for the wireless earphone is in a wireless charging range, and the charging base 200 radiates the electrical energy. When the wireless communication between the charging case 100 for the wireless earphone and the charging base 200 is disconnected, even if the charging case 100 for the wireless earphone is still placed on the charging base 200, the charging base 200 defaults that the charging case 100 for the wireless earphone is outside the wireless charging range. Here, in order to ensure safety of wireless charging, the charging base 200 will not radiate the electrical energy.

Therefore, once the wireless communication between the charging case 100 for the wireless earphone and the charging base 200 is disconnected, the charging base 200 stops radiating the electrical energy, or when the wireless communication between the charging case 100 for the wireless earphone and charging base 200 still fails to be reestablished after the wireless communication is disconnected for a period of time (for example, within 5 seconds), the charging base 200 stops radiating the electrical energy.

The metal portion 20 is a metal part in the charging case 100 for the wireless earphone, such as a copper part, an aluminum alloy part, etc. The metal portion 20 is spaced apart from the coil 10. It can be understood that when the charging base 200 radiates the electrical energy, the metal portion 20 is electrically connected with the charging base 200 by electromagnetic coupling. As a result, when the coil 10 receives the electrical energy from the charging base 200 through electromagnetic induction, the metal portion 20 can also absorb the electrical energy from the charging base 200 through electromagnetic induction and generate heat, such that a temperature of the metal portion 20 rises. In other words, when the coil 10 receives the electrical energy from the charging base 200 through the electromagnetic induction, the temperature of the metal portion 20 changes. It can be understood that when the temperature of the metal portion 20 rises, a temperature of the charging case 100 for the wireless earphone will rise, thereby affecting the safety of the charging case 100 for the wireless earphone during charging.

The control module 30 is a control center of the charging case 100 for the wireless earphone. The control module 30 may be, for example, a micro control unit (MCU). The control module 30 is electrically connected with the coil 10. The control module 30 is configured to control a charging process of the charging case 100 for the wireless earphone. For example, the control module 30 is configured to control, according to the temperature of the metal portion 20, to establish or disconnect the wireless communication via the coil 10 between the charging case 100 for the wireless earphone and the charging base 200. It can be understood that when the wireless communication between the charging case 100 for the wireless earphone and the charging base 200 is established via the coil 10, the charging base 200 defaults that the charging case 100 for the wireless earphone is in the wireless charging range, and the charging base 200 can radiate the electrical energy to charge the charging case 100 for the wireless earphone. When the wireless communication between the charging case 100 for the wireless earphone and the charging base 200 is disconnected via the coil 10, the charging base 200 defaults that the charging case 100 for the wireless earphone is outside the wireless charging range, and the charging base 200 stops radiating the electrical energy.

For example, during charging of the charging case 100 for the wireless earphone, when the temperature of the metal portion 20 is too high, the control module 30 can control to disconnect the wireless communication via the coil 10 between the charging case 100 for the wireless earphone and the charging base 200, such that the charging base 200 stops radiating the electrical energy, and the metal portion 20 no longer generates heat and gradually cools down. When the temperature of the metal portion 20 decreases to a relatively low range, the control module 30 controls to establish the wireless communication via the coil 10 between the charging case 100 for the wireless earphone and the charging base 200, such that the charging base 200 starts to radiate the electrical energy to continue to charge the charging case 100 for the wireless earphone. Therefore, under the control of the control module 30, the temperature of the metal portion 20 can be kept in a controllable range, and the temperature of the charging case 100 for the wireless earphone is also in a controllable range, such that the safety of the charging case 100 for the wireless earphone can be improved during wireless charging.

The receive circuit 40 is electrically connected with the coil 10. The receive circuit 40 is configured to process the electrical energy received by the coil 10, such as filtering, rectifying and other processes, to form a charging current.

The battery 50 is electrically connected with the receive circuit 40, and a current output by the receive circuit 40 can be used to charge the battery 50. Therefore, the electrical energy received by the coil 10 can be stored in the battery 50.

Figure 2:
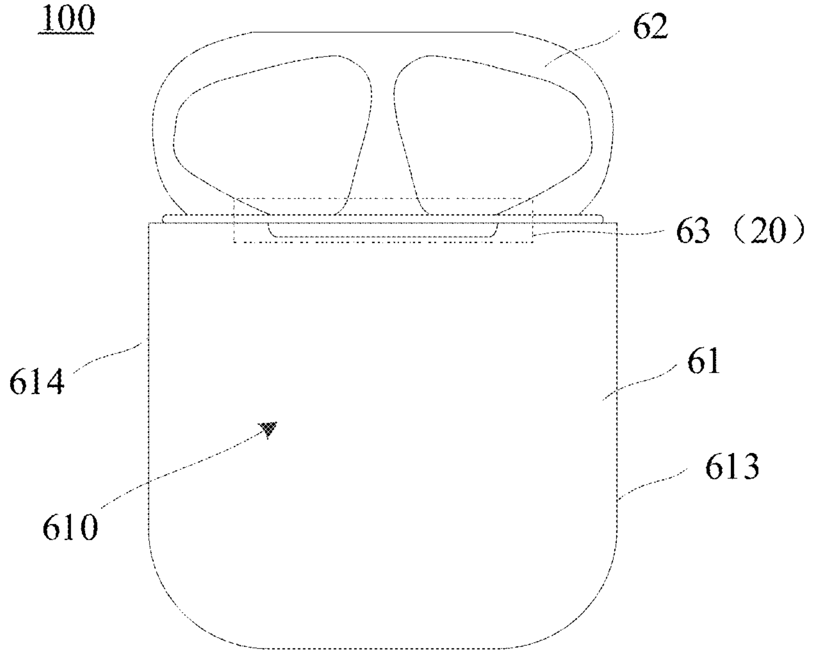
FIG. 2 is a front view of a charging case for a wireless earphone provided in implementations of the present disclosure.
Figure 3:
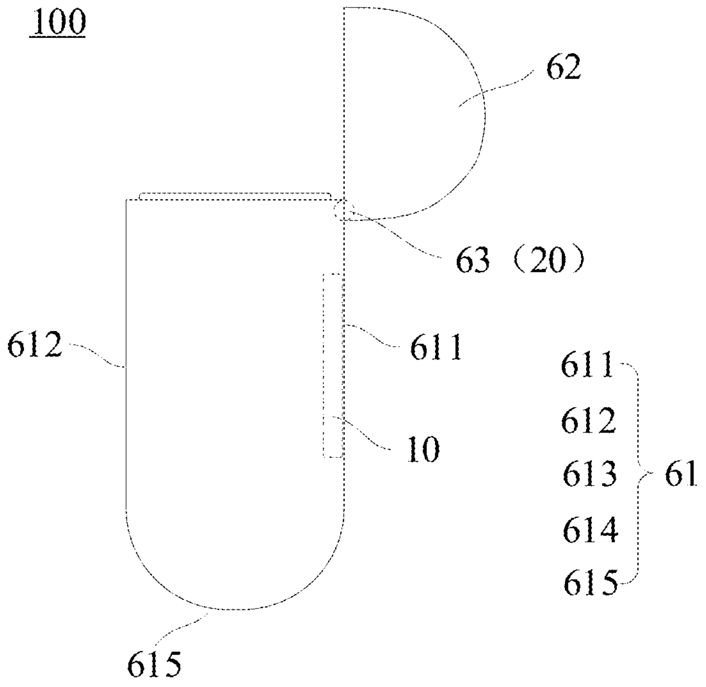
FIG. 3 is a side view of a charging case for a wireless earphone provided in some implementations of the present disclosure.
Figure 4:
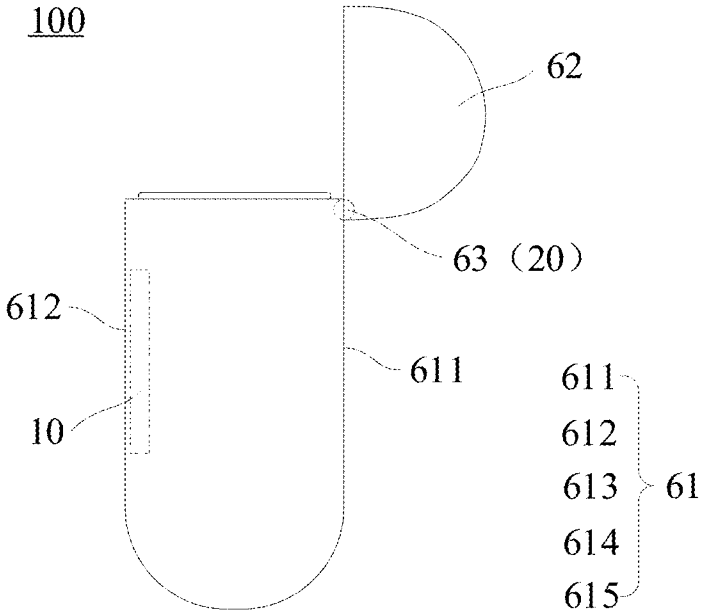
FIG. 4 is a side view of a charging case for a wireless earphone provided in other implementations of the present disclosure.

Reference can be made to FIG. 2, FIG. 3, and FIG. 4 together, where FIG. 2 is a front view of a charging case 100 for a wireless earphone provided in implementations of the present disclosure, FIG. 3 is a side view of a charging case 100 for a wireless earphone provided in some implementations of the present disclosure, and FIG. 4 is a side view of a charging case for a wireless earphone provided in other implementations of the present disclosure.

The charging case 100 for the wireless earphone includes a charging-case body 61, a charging-case cover 62, and a metal rotating shaft 63. The charging-case cover 62 is connected with the charging-case body 61, for example, the charging-case cover 62 is connected with the charging-case body 61 through the metal rotating shaft 63. The charging-case body 61, the metal rotating shaft 63, and the charging-case cover 62 may form a hinge structure, such that the charging-case cover 62 can rotate around the metal rotating shaft 63 relative to the charging-case body 61, and the charging case 100 for the wireless earphone can be switched between an open state and a closed state. The charging case 100 for the wireless earphone is in the open state as illustrated in FIG. 2. When the charging case 100 for the wireless earphone is in the closed state, the charging-case cover 62 is attached to the charging-case body 61. The metal rotating shaft 63 may be made of a material such as an aluminum alloy.

The coil 10 may be disposed at the charging-case body 61. It can be understood that the coil 10 being disposed at the charging-case body 61 includes at least one of following cases. The coil 10 may be disposed close to an inner surface of a case of the charging-case body 61, the coil 10 may be disposed close to an outer surface of the case of the charging-case body 61, and the coil 10 may be disposed in the case of the charging-case body 61, for example, the coil 10 may be attached to the inner surface or the outer surface of the case, or embedded in the case. In the field of wireless charging, a wireless charging efficiency is in relation to a distance between a coil in a transmit end and a coil in a receive end, so a distance between the coil and the case may be set according to needs of charging efficiency of an actual product. Therefore, when the charging case 100 for the wireless earphone is placed on the charging base 200, the coil 10 can receive the electrical energy from the charging base 200 through the electromagnetic induction, so as to charge the charging case 100 for the wireless earphone. The control module 30 may be disposed in the charging-case body 61, such that a charging process of the charging case 100 for the wireless earphone can be controlled with aid of the control module 30.

It can be understood that the charging-case cover 62 is connected with the charging-case body 61 through the metal rotating shaft 63, so when the coil 10 receives the electrical energy from the charging base 200, the metal rotating shaft 63 may also absorb the electrical energy from the charging base 200 through the electromagnetic induction and generate heat. Therefore, in some implementations, the metal portion 20 may include the metal rotating shaft 63.

In some implementations, the charging-case body 61 defines an accommodation space 610. The accommodation space 610 may be a cavity defined in the charging-case body 61. The accommodation space 610 can be configured to accommodate the wireless earphone. For example, the charging case 100 for the wireless earphone can charge the wireless earphone by placing the wireless earphone in the accommodation space 610. In addition, it can be understood that the control module 30 may also be disposed in the accommodation space 610.

In some implementations, the charging-case body 61 includes a side wall 611, a side wall 612, a side wall 613, a side wall 614, and a bottom wall 615. The side wall 612 is disposed opposite to the side wall 611, and the side wall 614 is disposed opposite to the side wall 613. The side wall 611, the side wall 613, the side wall 612, and the side wall 614 are connected in sequence. The bottom wall 615 is connected with the side wall 611, the side wall 613, the side wall 612, and the side wall 614 respectively. Therefore, the side wall 611, the side wall 613, the side wall 612, the side wall 614, and the bottom wall 615 may cooperatively define the accommodation space 610. It can be understood that an opening of the charging-case body 61 may be defined in a direction opposite to the bottom wall 615, that is, an opening of the accommodation space 610.

In some implementations, the metal rotating shaft 63 and the coil 10 may be disposed at the same side wall of the charging-case body 61. For example, the metal rotating shaft 63 is connected with a first side wall of the charging-case body 61, and the coil 10 is also disposed at the first side wall of the charging-case body 61, as illustrated in FIG. 3. In the circumstances, since the metal rotating shaft 63 is close to the coil 10, the temperature of the metal rotating shaft 63 rises greatly during the wireless charging. However, this design is relatively convenient for the user to open the cover and take out the earphone during the wireless charging of the charging case 100 for the wireless earphone, and may be more in line with usage habits of the user, so there are certain advantages in use.

In some implementations, the metal rotating shaft 63 and the coil 10 are disposed at different side walls of the charging-case body 61. For example, the metal rotating shaft 63 is connected with the first side wall of the charging-case body 61, and the coil 10 is disposed at a second side wall of the charging-case body 61, as illustrated in FIG. 4. In the circumstances, since the metal rotating shaft 63 is relatively away from the coil 10, the temperature of the metal rotating shaft 63 rises slightly during the wireless charging. However, this design mode is not convenient for the user to open the cover and take out the earphone during the wireless charging of the charging case 100 for the wireless earphone, and may be different from a usual placement mode in which the charging case 100 for the wireless earphone is placed on the charging base 200.

In some implementations, the coil 10 may also be disposed at multiple side walls of the charging-case body 61. For example, the metal rotating shaft 63 is connected with the first side wall of the charging-case body 61, and the coil 10 is disposed at the first side wall and the second side wall of the charging-case body 61. For example, the coil 10 includes a first coil and a second coil, the first coil is disposed at the first side wall of the charging-case body 61, and the second coil is disposed at the second side wall of the charging-case body 61. Therefore, when any one of the first side wall and the second side wall is placed on the charging base 200, the charging base 200 can quickly charge the charging case 100 for the wireless earphone, such that requirements of the user for placing the charging case for the wireless earphone at multiple angles can be met. It can be understood that in the circumstances, when the charging case 100 for the wireless earphone starts wireless charging, that is, when the charging case 100 for the wireless earphone is charged wirelessly, a coil of which side wall or coils of which side walls can be selected to receive electrical energy according to a wireless charging efficiency of each side wall, so as to improve the wireless charging efficiency.

The first side wall may be any one of the side wall 611, the side wall 612, the side wall 613, and the side wall 614, and the second side wall and the first side wall are different side walls. For example, the first side wall may be the side wall 611, the second side wall may be the side wall 612 disposed opposite to the side wall 611, and the second side wall may also be the side wall 613 or the side wall 614 disposed adjacent to the side wall 611.

The coil 10 is disposed at the first side wall, the second side wall, or both the first side wall and the second side wall, which may be implemented in various modes.

For example, in some implementations, the coil 10 may be buried in the first side wall or the second side wall. For example, the first side wall or the second side wall may define a recess, and after the coil 10 is disposed in the recess, the coil 10 is covered with non-metallic materials such as plastic. It can be understood that when the coil 10 is buried in the first side wall or the second side wall, the coil 10 can be prevented from moving or falling off during the use of the charging case 100 for the wireless earphone, and mounting stability of the coil 10 can be improved.

For another example, in some implementations, the coil 10 may also be attached to a surface of the first side wall or a surface of the second side wall or may be disposed close to the surface of the first side wall or the surface of the second side wall, for example, the coil 10 is attached to an inner surface of the first side wall or an inner surface of the second side wall by glue. It can be understood that when the coil 10 is attached to the surface of the first side wall or the surface of the second side wall, a mounting process of the coil 10 can be simplified.

It can be understood that during charging of the charging case 100 for the wireless earphone, the coil 10 is close to the charging base 200. When the metal rotating shaft 63 and the coil 10 are disposed on the same side wall of the charging-case body 61, a distance between the metal rotating shaft 63 and the coil 10 is small, that is, a distance between the metal rotating shaft 63 and the charging base 200 is also small, so when the coil 10 receives electrical energy from charging base 200, a condition where the metal rotating shaft 63 absorbs electrical energy from the charging base 200 and generates heat is relatively severe, thereby resulting in a quick rise of the temperature of the metal rotating shaft 63.

Therefore, in some implementations, in order to reduce heat generation of the metal rotating shaft 63 during charging, the metal rotating shaft 63 and the coil 10 may be disposed at different side walls of the charging-case body 61 to increase the distance between the metal rotating shaft 63 and the coil 10, that is, to increase the distance between the metal rotating shaft 63 and the charging base 200, such that the heat generation of the metal rotating shaft 63 is reduced.

In the description of the present disclosure, it should be understood that terms such as "first", "second", and the like are only used to distinguish similar objects, and cannot be understood as indicating or implying relative importance or implicitly indicating the number of technical features indicated.

Figure 5:
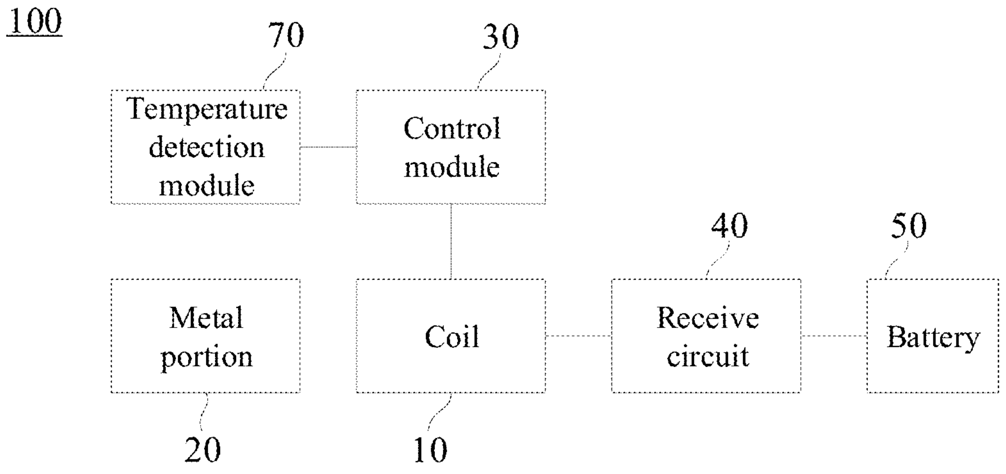
FIG. 5 is a schematic structural view of a charging case for a wireless earphone provided in some implementations of the present disclosure.

In some implementations, reference can be made to FIG. 5, which is a schematic structural view of a charging case 100 for a wireless earphone provided in some implementations of the present disclosure.

The charging case 100 for the wireless earphone further includes a temperature detection module 70. The temperature detection module 70 is configured to detect the temperature of the metal portion 20. The temperature detection module 70 is electrically connected with the control module 30, such that the temperature detection module 70 can transmit temperature data detected to the control module 30, and the control module 30 can obtain the temperature of the metal portion 20.

The temperature detection module 70 may include a temperature sensor. For example, the temperature sensor may be implemented by a thermistor. The temperature detection module 70 may be disposed at the metal portion 20, such as be attached to a surface of the metal portion 20. The temperature detection module 70 may also be disposed at other parts of the charging case 100 for the wireless earphone, such as being disposed at the side wall of the charging-case body 61. It can be understood that when the temperature detection module 70 is disposed at other parts, the temperature of the metal portion 20 can be detected through the temperature detection module 70 only by establishing a correspondence between the temperature of the metal portion 20 and a temperature of a part where the temperature detection module 70 is located.

In some implementations, when a temperature detected by the temperature detection module 70 is greater than or equal to a first preset temperature, the control module 30 controls to disconnect the wireless communication via the coil 10 between the charging case 100 for the wireless earphone and the charging base 200, such that the charging base 200 stops radiating the electrical energy. The first preset temperature is a preset temperature value, and the first preset temperature may be set according to experience or be measured according to experiments. For example, the first preset temperature may be 40 degrees Celsius.

For example, when the temperature detected by the temperature detection module 70 is greater than or equal to 40 degrees Celsius, the control module 30 controls to disconnect the wireless communication via the coil between the charging case 100 for the wireless earphone and the charging base 200. Here, the charging base 200 is unable to detect the wireless communication with the charging case 100 for the wireless earphone, so the charging base 200 defaults that the charging case 100 for the wireless earphone is outside the wireless charging range, and the charging base 200 stops radiating the electrical energy. Therefore, under the control of the control module 30, a wireless charging process can be temporarily interrupted, such that the temperature of the metal portion 20 can be prevented from rising continuously, and the safety of the charging case 100 for the wireless earphone can be ensured.

When the temperature detected by the temperature detection module 70 is less than a second preset temperature, the control module 30 controls to establish the wireless communication via the coil 10 between the charging case 100 for the wireless earphone and the charging base 200, such that the charging base 200 starts to radiate the electrical energy. The second preset temperature is less than or equal to the first preset temperature. For example, when the first preset temperature is 40 degrees Celsius, the second preset temperature may be 40 degrees Celsius, or less than 40 degrees Celsius, such as 25 degrees Celsius, etc.

For example, when the temperature detected by the temperature detection module 70 is less than 25 degrees Celsius, the control module 30 controls to establish the wireless communication via the coil 10 between the charging case 100 for the wireless earphone and the charging base 200. When the wireless communication between the charging case 100 for the wireless earphone and the charging base 200 is established via the coil 10, the charging base 200 defaults that the charging case 100 for the wireless earphone is in the wireless charging range, and the charging base 200 starts to radiate the electrical energy, such that the wireless charging process is resumed.

Therefore, during charging of the charging case 100 for the wireless earphone, not only can the temperature of the metal portion 20 be ensured not to be too high, but also the charging case 100 for the wireless earphone can be charged as quickly as possible. In implementations of the present disclosure, the charging case 100 for the wireless earphone can control the wireless charging process according to the temperature of the metal portion 20, such as the temperature of the metal rotating shaft 63, such that the safety is avoided to be affected due to a too high temperature of the charging case 100 for the wireless earphone. Especially, when the user places the side wall connected with the metal rotating shaft 63 close to the charging base 200, safety risks caused by a too high temperature of the metal rotating shaft 63 can be avoided effectively, and the user can be ensured to place the charging case 100 for the wireless earphone at multiple angles, so as to facilitate usage of the user in implementations of the present disclosure.

It can be understood that if the second preset temperature is set to be equal to the first preset temperature, for example, both are 40 degrees Celsius, the wireless charging is controlled to be interrupted when the temperature of the metal portion 20 is greater than or equal to the first preset temperature, and the wireless charging is controlled to be resumed when the temperature of the metal portion 20 is less than the first preset temperature. In actual application, the control module 30 needs to perform frequent control operations, and the charging base 200 also needs to perform frequent actions, which also results in frequent interruption and resumption of the wireless charging process of the charging case 100 for the wireless earphone, thereby resulting in an unstable wireless charging process of the charging case 100 for the wireless earphone. Therefore, in order to improve wireless charging stability of the charging case 100 for the wireless earphone, the second preset temperature can be set to be less than the first preset temperature, that is, two different temperature values can be set to control the interruption of the wireless charging and the resumption of the wireless charging respectively. For example, the first preset temperature may be set to 40 degrees Celsius, the second preset temperature may be set to 30 degrees Celsius, 25 degrees Celsius, and so on.

Therefore, during charging of the charging case 100 for the wireless earphone, not only can the temperature of the metal portion 20 be ensured not to be too high, but also the charging case 100 for the wireless earphone can be charged as quickly as possible. In the meanwhile, the frequent interruption and resumption of the wireless charging of the charging case 100 for the wireless earphone can be avoid, such that the wireless charging stability of the charging case 100 for the wireless earphone can be improved.

Figure 6:
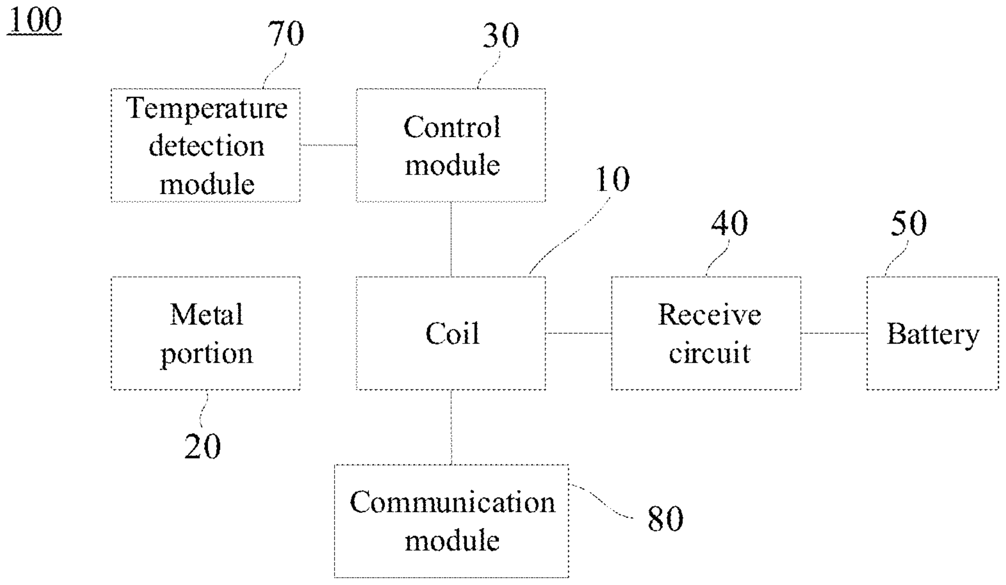
FIG. 6 is a schematic structural view of a charging case for a wireless earphone provided in other implementations of the present disclosure.

In some implementations, reference can be made to FIG. 6, which is a schematic structural view of a charging case 100 for a wireless earphone provided in other implementations of the present disclosure.

The charging case 100 for the wireless earphone further includes a communication module 80. The communication module 80 is configured to provide a communication signal. The coil 10 is electrically connected with the communication module 80. The coil 10 is configured to transmit the communication signal to the charging base 200 to establish the wireless communication between the charging case 100 for the wireless earphone and the charging base 200, or interrupt transmission of the communication signal to disconnect the wireless communication between the charging case 100 for the wireless earphone and the charging base 200.

For example, the control module 30 can control the coil 10 to interrupt the transmission of the communication signal when the temperature of the metal portion 20 is too high, for example, when the temperature of the metal portion 20 is greater than or equal to the first preset temperature, such that the wireless communication between the charging case 100 for the wireless earphone and the charging base 200 is disconnected via the coil 10. Therefore, the charging base 200 can be indirectly controlled to stop radiating the electrical energy to interrupt the wireless charging.

In addition, the control module 30 can also control the coil 10 to transmit the communication signal when the temperature of the metal portion 20 is relatively low, for example, when the temperature of the metal portion 20 is less than the second preset temperature, such that wireless communication between the charging case 100 for the wireless earphone and the charging base 200 is established via the coil 10. Therefore, the charging base 200 can be indirectly controlled to start to radiate the electrical energy to resume the wireless charging.

Figure 7:
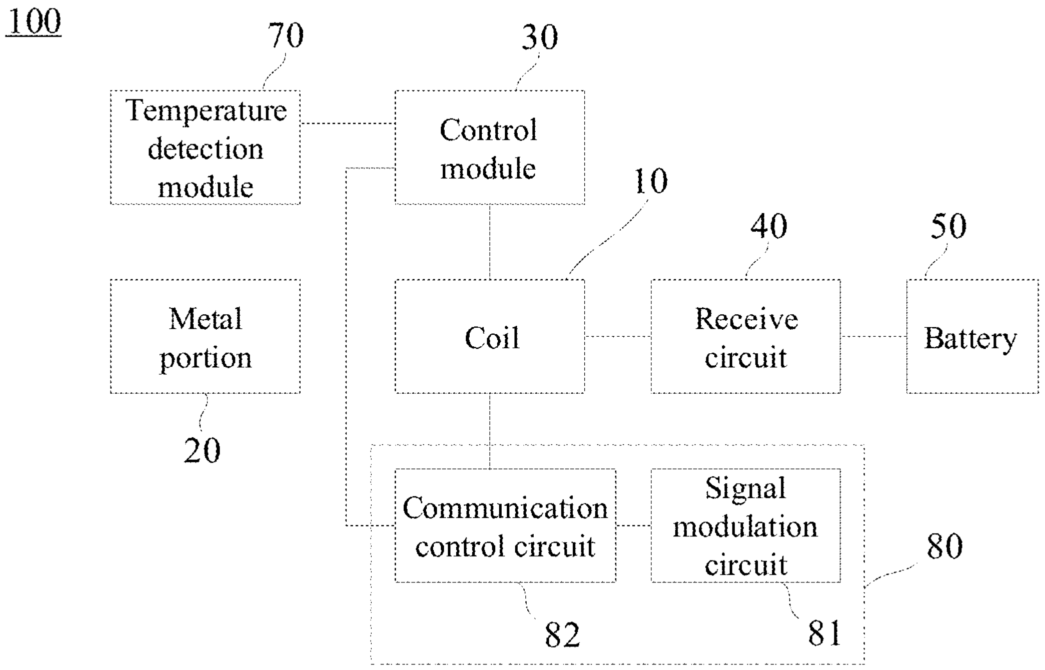
FIG. 7 is a schematic structural view of a charging case for a wireless earphone provided in other implementations of the present disclosure.

In some implementations, reference can be made to FIG. 7, which is a schematic structural view of a charging case 100 for a wireless earphone provided in other implementations of the present disclosure.

The communication module 80 includes a signal modulation circuit 81 and a communication control circuit 82. The signal modulation circuit 81 is configured to provide the communication signal. The communication control circuit 82 is electrically connected with the signal modulation circuit 81, the coil 10, and the control module 30 respectively. Therefore, the communication signal provided by the signal modulation circuit 81 can be transmitted to the coil 10 through the communication control circuit 82, and then be transmitted to the charging base 200 via the coil 10 to establish the wireless communication between the charging case 100 for the wireless earphone and the charging base 200.

The control module 30 can be configured to control the communication control circuit 82 to be connected with the coil 10, to make the coil 10 transmit the communication signal, such that the wireless communication between the charging case 100 for the wireless earphone and the charging base 200 is established via the coil 10; or the control module 30 can be configured to be disconnected from the coil 10, to make the coil 10 interrupt the transmission of the communication signal, such that wireless communication between the charging case 100 for the wireless earphone and the charging base 200 is disconnected via the coil 10.

For example, when the wireless communication between the charging case 100 for the wireless earphone and the charging base 200 needs to be established, the control module 30 can control the communication control circuit 82 to be connected with the coil 10, such that the coil 10 transmits the communication signal to the charging base 200, for example, responds to a handshake signal broadcast by the charging base 200, such that the wireless communication between the charging case 100 for the wireless earphone and the charging base 200 is established.

When the wireless communication between the charging case 100 for the wireless earphone and the charging base 200 needs to be disconnected, the control module 30 can control the communication control circuit 82 to be disconnected from the coil 10, to cause the coil 10 to interrupt the transmission of the communication signal, such that the communication signal cannot be transmitted to the charging base 200, and the wireless communication between the charging case 100 for the wireless earphone and the charging base 200 is disconnected.

Figure 8:
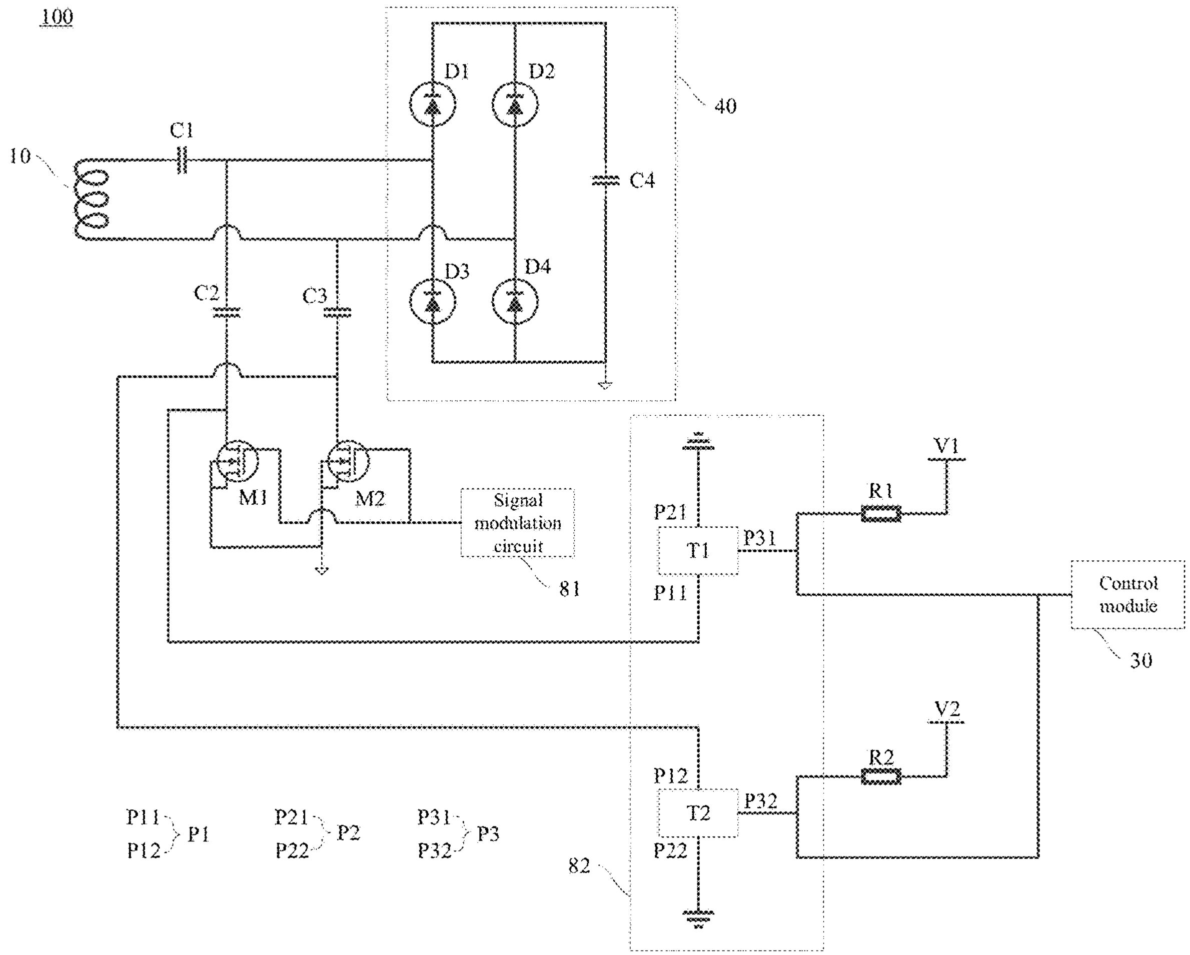
FIG. 8 is a schematic structural view of a charging case for a wireless earphone provided in other implementations of the present disclosure.

In some implementations, reference can be made to FIG. 8, which is a schematic structural view of a charging case 100 for a wireless earphone provided in other implementations of the present disclosure.

The coil 10 may be connected with the receive circuit 40 through a capacitor C1, and connected with the communication control circuit 82 through a capacitor C2 and a capacitor C3. The communication control circuit 82 is connected with the signal modulation circuit 81 through a metal oxide semiconductor (MOS) transistor M1 and a MOS transistor M2.

The capacitor C1 may function as a filter to filter out an interference signal in the electrical energy received by the coil 10. The capacitor C2 and the capacitor C3 may also function as filters to prevent the electrical energy received by coil 10 from being transmitted to the communication control circuit 82 and the signal modulation circuit 81.

The receive circuit 40 includes a diode D1, a diode D2, a diode D3, a diode D4, and a capacitor C4. The diode D1, the capacitor C4, and the diode D3 are sequentially connected in series and connected with one end of the coil 10. The diode D2, the capacitor C4, and the diode D4 are sequentially connected in series and connected with the other end of the coil 10. The battery 50 may be connected across the capacitor C4 in parallel to charge the battery 50.

It can be understood that a capacitance value of the capacitor C1, a capacitance value of the capacitor C2, a capacitance value of the capacitor C3, and a capacitance value of the capacitor C4 may be set according to actual needs, a specification of the MOS transistor M1 and a specification of the MOS transistor M2 may be set according to actual needs, and a specification of the diode D1, a specification of the diode D2, a specification of the diode D3, and a specification of the diode D4 may also be set according to actual needs.

The communication control circuit 82 includes a first port P1, a second port P2, and a third port P3. The first port P1 is electrically connected with the signal modulation circuit 81 and the coil 10. For example, the first port P1 may be electrically connected with the signal modulation circuit 81 through the MOS transistor M1 and the MOS transistor M2, and electrically connected with the coil 10 through the capacitor C2 and the capacitor C3. The second port P2 is grounded. The third port P3 is electrically connected with the control module 30.

It can be understood that the communication control circuit 82 may be electrically connected with two ends of the coil 10, so each of the first port P1, the second port P2, and the third port P3 may include two sub-ports. For example, the first port P1 may include a sub-port P11 and a sub-port P12, the second port P2 may include a sub-port P21 and a sub-port P22, and the third port P3 may include a sub-port P31 and a sub-port P32.

The sub-port P11 is electrically connected with the signal modulation circuit 81 through the MOS transistor M1, and is electrically connected with one end of the coil 10 through the capacitor C2. The sub-port P12 is electrically connected with the signal modulation circuit 81 through the MOS transistor M2, and is electrically connected with the other end of the coil 10 through the capacitor C3. The sub-port P21 and the sub-port P22 each are grounded. The sub-port P31 and the sub-port P32 each are electrically connected with the control module 30.

In addition, the sub-port P31 may also be connected with a power supply V1 through a resistor R1, and the sub-port P32 may also be connected with a power supply V2 through a resistor R2. A resistance value of the resistor R1 and a resistance value of the resistor R2 may be set according to actual needs. For example, each of the power supply V1 and the power supply V2 may be a 5 volts (V) power supply.

The control module 30 can be configured to transmit a control signal to the communication control circuit 82. For example, the control module 30 can be configured to transmit the control signal to the communication control circuit 82 through the third port P3, to control connection or disconnection between the first port P1 and the second port P2. For example, connection or disconnection between the sub-port P11 and the sub-port P21 is controlled, and connection or disconnection between the sub-port P12 and the sub-port P22 is controlled.

It can be understood that the second port P2 is grounded, for example, the sub-port P21 and the sub-port P22 of the second port P2 are grounded, such that when the first port P1 is connected with the second port P2, a signal passing through the first port P1 directly returns to ground. Here, the coil 10 is equivalent to short circuit for the communication signal, that is, the coil 10 is not conducted with the communication control circuit 82, and it may also be considered that the coil 10 is disconnected from the communication control circuit 82. Therefore, the communication signal provided by the signal modulation circuit 81 directly returns to the ground through the first port P1, and is not transmitted outward through the coil 10. However, when the first port P1 is disconnected from the second port P2, the signal passing through the first port P1 does not return to the ground. Here, the coil 10 is conducted with the communication control circuit 82, so the communication signal provided by the signal modulation circuit 81 can be transmitted to the coil 10 and then transmitted to the charging base 200 through the coil 10.

Therefore, in implementations of the present disclosure, when the wireless communication between the charging case 100 for the wireless earphone and the charging base 200 needs to be disconnected, the control module 30 can transmit a control signal to the communication control circuit 82 to connect the first port P1 with the second port P2, that is, connect the sub-port P11 with the sub-port P21, and connect the sub-port P12 with the sub-port P22, such that the communication signal provided by the signal modulation circuit 81 returns to the ground through the second port P2. Here, the communication signal provided by the signal modulation circuit 81 will not be transmitted outward through the coil 10, such that the wireless communication between the charging case 100 for the wireless earphone and the charging base 200 can be disconnected.

When the wireless communication between the charging case 100 for the wireless earphone and the charging base 200 needs to be established or kept, the control module 30 can transmit a control signal to the communication control circuit 82 to disconnect the first port P1 from the second port P2, that is, disconnect the sub-port P11 from the sub-port P21, and disconnect the sub-port P12 from the sub-port P22. Here, the communication signal provided by the signal modulation circuit 81 can be transmitted outward through the coil 10, such that the wireless communication between the charging case 100 for the wireless earphone and the charging base 200 can be established or kept.

In some implementations, reference can continue to be made to FIG. 8. The communication control circuit 82 includes transistors such as a transistor T1 and a transistor T2. The transistors are electrically connected with the first port P1, the second port P2, and the third port P3. For example, the transistor T1 is electrically connected with the sub-port P11, the sub-port P21, and the sub-port P31, and the transistor T2 is electrically connected with the sub-port P12, the sub-port P22, and the sub-port P32.

The control module 30 is configured to control the transistors to connect the first port P1 with the second port P2 or disconnect the first port P1 from the second port P2. For example, the control module 30 can be configured to control connection between the sub-port P11 and the sub-port P21 and to control connection between the sub-port P12 and the sub-port P22, such that the wireless communication between the charging case 100 for the wireless earphone and the charging base 200 is disconnected. Alternatively, the control module 30 can be configured to control disconnection between the sub-port P11 and the sub-port P21 and to control disconnection between the sub-port P12 and the sub-port P22, such that wireless communication between the charging case 100 for the wireless earphone and the charging base 200 is established or kept.

Figure 9:
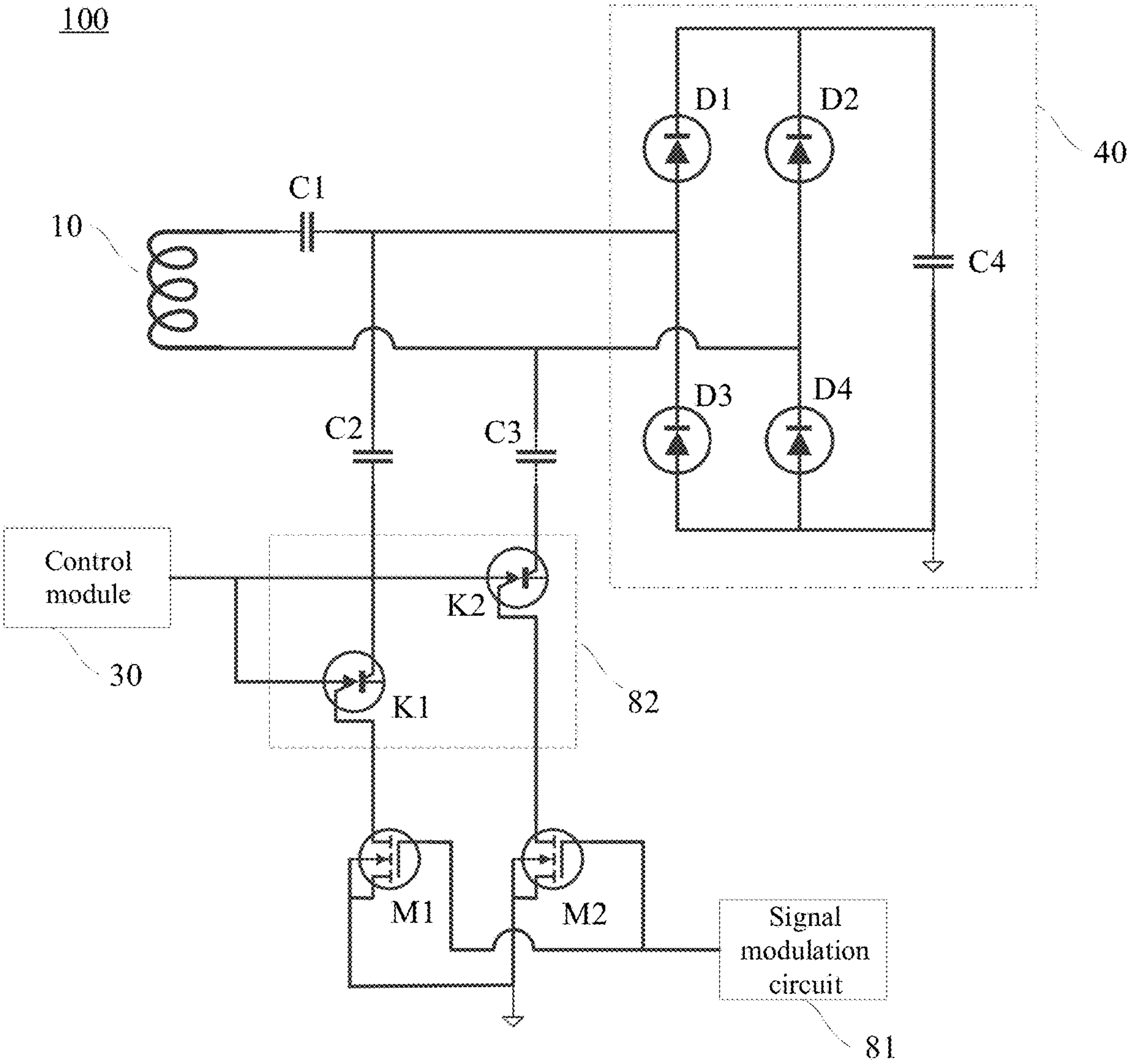
FIG. 9 is a schematic structural view of a charging case for a wireless earphone provided in other implementations of the present disclosure.

In some implementations, reference can be made to FIG. 9, which is a schematic structural view of a charging case 100 for a wireless earphone provided in other implementations of the present disclosure.

The communication control circuit 82 includes analogue switches, such as an analogue switch K1 and an analogue switch K2. The analogue switch K1 and the analogue switch K2 are configured to connect the signal modulation circuit 81 with the coil 10 or disconnect the signal modulation circuit 81 from the coil 10. The analogue switch K1 and the analogue switch K2 may be implemented by MOS transistors, thin film transistors (TFTs), and the like. The analogue switch K1 is electrically connected with the signal modulation circuit 81 through the MOS transistor M1, connected with one end of the coil 10 through the capacitor C2, and electrically connected with the control module 30. The analogue switch K2 is electrically connected with the signal modulation circuit 81 through the MOS transistor M2, connected with the other end of the coil 10 through the capacitor C3, and electrically connected with the control module 30.

The control module 30 is configured to control the analogue switches to be turned on or off, for example, to control the analogue switch K1 and the analogue switch K2 to be turned on at the same time to make the signal modulation circuit 81 connected with the coil 10, or to control the analogue switch K1 and the analogue switch K2 to be turned off at the same time to make the signal modulation circuit 81 disconnected from the coil 10.

For example, when the wireless communication between the charging case 100 for the wireless earphone and the charging base 200 needs to be disconnected, the control module 30 can transmit the control signal to the analogue switch K1 and the analogue switch K2, such that the analogue switch K1 and the analogue switch K2 are turned off at the same time, and electrical connection between the signal modulation circuit 81 and the coil 10 is disconnected. Therefore, the communication signal provided by the signal modulation circuit 81 is not transmitted outward through the coil 10, such that the wireless communication between the charging case 100 for the wireless earphone and the charging base 200 can be disconnected.

When the wireless communication between the charging case 100 for the wireless earphone and the charging base 200 needs to be established or kept, the control module 30 can transmit the control signal to the analogue switch K1 and the analogue switch K2, such that the analogue switch K1 and the analogue switch K2 are turned on at the same time, and the electrical connection between the signal modulation circuit 81 and the coil 10 is kept. Here, the communication signal provided by the signal modulation circuit 81 can be transmitted outward through the coil 10, such that the wireless communication between the charging case 100 for the wireless earphone and the charging base 200 can be established or kept.

The charging case and the wireless charging system provided in implementations of the present disclosure are described in detail above. Principles and implementation manners of the present disclosure are elaborated with specific implementations herein. The above illustration of implementations is only used to help to understand the present disclosure. At the same time, for those skilled in the art, according to ideas of the present disclosure, there will be changes in specific implementation manners and application scope. In summary, contents of this specification should not be understood as limitation to the present disclosure.

What is claimed is:

1. A wireless charging system, comprising:

a charging base configured to radiate electrical energy wirelessly; and a charging case for a wireless earphone, comprising:

a coil configured for wireless communication between the charging case for the wireless earphone and the charging base, and configured to receive electrical energy from the charging base through electromagnetic induction during the wireless communication between the charging case for the wireless earphone and the charging base;

a metal portion spaced apart from the coil;

a control module electrically connected with the coil, wherein the control module is configured to control, according to a temperature of the metal portion, to establish or disconnect the wireless communication via the coil between the charging case and the charging base;

a charging-case body, wherein the coil and the control module are disposed at the charging-case body; and a charging-case cover connected with the charging-case body through a metal rotating shaft of the metal portion.

2. A charging case for a wireless earphone, comprising:

a coil configured for wireless communication between the charging case for the wireless earphone and a charging base, and configured to receive electrical energy from the charging base through electromagnetic induction during the wireless communication between the charging case for the wireless earphone and the charging base;

a metal portion spaced apart from the coil;

a control module electrically connected with the coil, wherein the control module is configured to control, according to a temperature of the metal portion, to establish or disconnect the wireless communication via the coil between the charging case for the wireless earphone and the charging base;

a charging-case body, wherein the coil and the control module are disposed at the charging-case body; and a charging-case cover connected with the charging-case body through a metal rotating shaft of the metal portion.

3. The charging case for the wireless earphone of claim 2, wherein the temperature of the metal portion changes, when the coil receives the electrical energy from the charging base through the electromagnetic induction.

4. The charging case for the wireless earphone of claim 2, wherein the charging-case body comprises:

a first side wall connected with the metal rotating shaft; and a second side wall, wherein the coil is disposed at the second side wall.

5. The charging case for the wireless earphone of claim 1, wherein the charging-case body comprises:

a first side wall, wherein the metal rotating shaft is connected with the first side wall, and the coil is disposed at the first side wall.

6. The charging case for the wireless earphone of claim 2, wherein the charging-case body comprises:

a first side wall connected with the metal rotating shaft; and a second side wall;

wherein the coil is disposed at the first side wall and the second side wall.

7. The charging case for the wireless earphone of claim 2, wherein the charging-case body defines an accommodation space, and the wireless earphone is accommodated in the accommodation space.

8. The charging case for the wireless earphone of claim 2, further comprising:

a temperature detection module configured to detect the temperature of the metal portion, and electrically connected with the control module.

9. The charging case for the wireless earphone of claim 8, wherein the control module is configured to:

control to disconnect the wireless communication via the coil between the charging case for the wireless earphone and the charging base, on condition that the temperature detected by the temperature detection module is greater than or equal to a first preset temperature; and/or control to establish the wireless communication via the coil between the charging case for the wireless earphone and the charging base, on condition that the temperature detected by the temperature detection module is less than a second preset temperature;

wherein the second preset temperature is less than or equal to the first preset temperature.

10. The charging case for the wireless earphone of claim 2, further comprising:

a communication module configured to provide a communication signal;

wherein the coil is electrically connected with the communication module, and the coil is configured to transmit the communication signal to the charging base to establish the wireless communication between the charging case for the wireless earphone and the charging base, or interrupt transmission of the communication signal to disconnect the wireless communication between the charging case for the wireless earphone and the charging base.

11. The charging case for the wireless earphone of claim 10, wherein the communication module comprises:

a signal modulation circuit configured to provide the communication signal; and a communication control circuit electrically connected with the signal modulation circuit, the coil, and the control module;

wherein the control module is configured to control the communication control circuit to be connected with the coil to make the charging case for the wireless earphone establish the wireless communication with the charging base, or control the communication control circuit to be disconnected from the coil to make the charging case for the wireless earphone disconnect the wireless communication from the charging base.

12. The charging case for the wireless earphone of claim 11, wherein:

the communication control circuit comprises an analogue switch, and the analogue switch is configured to connect the signal modulation circuit with the coil or disconnect the signal modulation circuit from the coil; and the control module is configured to control the analogue switch to be turned on or turned off.

13. The charging case for the wireless earphone of claim 11, wherein:

the communication control circuit comprises a first port, a second port, and a third port, the first port is electrically connected with the signal modulation circuit and the coil, the second port is grounded, and the third port is electrically connected with the control module; and the control module is configured to control connection or disconnection between the first port and the second port.

14. The charging case for the wireless earphone of claim 13, wherein:

the communication control circuit further comprises a transistor, and the transistor is electrically connected with the first port, the second port, and the third port; and the control module is configured to control the transistor to connect the first port with the second port or disconnect the first port from the second port.

15. A charging case, comprising:

a coil configured for wireless communication between the charging case and a charging base, and configured to receive electrical energy from the charging base through electromagnetic induction during the wireless communication between the charging case and the charging base;

a metal portion spaced apart from the coil, wherein a temperature of the metal portion changes when the coil receives the electrical energy from the charging base through the electromagnetic induction;

a control module electrically connected with the coil, wherein the control module is configured to control, according to the temperature of the metal portion, to establish or disconnect the wireless communication via the coil between the charging case and the charging base;

a charging-case body, wherein the coil and the control module are disposed at the charging-case body; and a charging-case cover connected with the charging-case body through a metal rotating shaft of the metal portion.

16. The charging case of claim 15, wherein the charging-case body comprises:

a first side wall connected with the metal rotating shaft; and a second side wall, wherein the coil is disposed at the second side wall.

17. The charging case of claim 15, wherein the charging-case body comprises:

a first side wall, wherein the metal rotating shaft is connected with the first side wall, and the coil is disposed at the first side wall.

18. The charging case of claim 15, wherein the charging-case body comprises:

a first side wall connected with the metal rotating shaft; and a second side wall;

wherein the coil is disposed at the first side wall and the second side wall.

* * * * *